United States Patent
Brown et al.

(10) Patent No.: US 8,264,486 B2
(45) Date of Patent: Sep. 11, 2012

(54) REAL-TIME HIGH-SPEED THREE DIMENSIONAL MODELING SYSTEM

(75) Inventors: Christopher Allen Brown, Bloomington, IN (US); Matthew Juhl, Springville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 689 days.

(21) Appl. No.: 12/509,428

(22) Filed: Jul. 24, 2009

(65) Prior Publication Data

US 2011/0018872 A1    Jan. 27, 2011

(51) Int. Cl.
*G06T 17/00* (2006.01)
*G06T 11/20* (2006.01)

(52) U.S. Cl. .................. 345/420; 345/442; 345/443

(58) Field of Classification Search .................. None
See application file for complete search history.

(56) References Cited

U.S. PATENT DOCUMENTS

| | | | |
|---|---|---|---|
| 5,342,051 A | 8/1994 | Rankin et al. | |
| 5,852,672 A | 12/1998 | Lu | |
| 6,042,492 A | 3/2000 | Baum | |
| 6,147,760 A | 11/2000 | Geng | |
| 6,600,168 B1 | 7/2003 | Geng | |
| 7,174,033 B2 | 2/2007 | Yukhin et al. | |
| 7,692,707 B2 * | 4/2010 | Kondo et al. | 348/311 |
| 7,843,429 B2 * | 11/2010 | Pryor | 345/158 |
| 7,990,422 B2 * | 8/2011 | Ahiska et al. | 348/218.1 |
| 2005/0128196 A1 | 6/2005 | Popescu et al. | |
| 2006/0050929 A1 | 3/2006 | Rast et al. | |
| 2007/0211022 A1 | 9/2007 | Boillot | |
| 2007/0299338 A1 | 12/2007 | Stevick et al. | |
| 2008/0118143 A1 | 5/2008 | Gordon et al. | |

OTHER PUBLICATIONS

Mengel et al.; "Time-of-flight camera for pedestrian protection and collision mitigation"; accepted at 6th European Congress and Exhibition of Intelligent Transport Systems, 2007.
Winkelbach, "David-Laserscanner 2.2—Incredibly Low-Cost 3D Scanner for Everyone"; 2007; www.david-laserscanner.com.

* cited by examiner

*Primary Examiner* — Joni Hsu
*Assistant Examiner* — Michelle Chin
(74) *Attorney, Agent, or Firm* — Christopher A. Monsey

(57) ABSTRACT

A high-speed modeling system and a method of constructing a model are disclosed herein. In one embodiment, the system comprises first and second cameras, a control portion to synchronize the first and second cameras, and a projector of electromagnetic patterns. The first and second cameras are synchronized by the control portion to generate second frames a time interval after first frames are generated to thereby obtain a high frame-rate which is higher than the frame-rate of the first camera. Multiple imaging stations comprising first and second cameras may be directed to the path traveled by a mass at a high speed, in a prescribed arrangement, to model the mass with the high frame-rate system.

40 Claims, 7 Drawing Sheets

REAL-TIME HIGH-SPEED THREE DIMENSIONAL MODELING SYSTEM

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

FIELD OF THE DISCLOSURE

The present disclosure relates generally to a system and method for modeling a mass moving at high velocity and, more particularly, to a high frame-rate video system which captures images of electromagnetic patterns projected onto the moving mass to compose a model of the mass.

BACKGROUND

Video systems can be used to determine characteristics of a moving mass. One common application of such systems is in sports analysis and testing in which characteristics of a moving object are extracted and used as a reference. In golf, for example, a golf ball can be extracted from video frames and successive frames can be compared to determine the flight of the ball. Similar systems can be used in baseball to determine the speed, spin, and flight-path of a ball. Laser beams placed near the pitching mound can be used to characterize the speed of a baseball bat based on the speed at which the bat intersects the laser beams. These systems depend on the relatively slow speed of the moving mass and the relatively unchanging shape of the mass. Imaging systems are also used to create 3D models of stationary objects. These systems are inadequate. Improved systems and methods are needed to model aeronautical objects, fluid flow, ballistic events and other mass systems for modeling mass systems moving at speeds exceeding the capacity of currently available video cameras.

SUMMARY

A high-speed modeling system and a method of constructing a model are disclosed herein. In one embodiment, the system comprises a master image sensor, at least one slave image sensor, a projector, a master processing portion and at least one slave processing portion. The master image sensor produces master signals corresponding to a path portion of a path traveled by a mass. The at least one slave image sensor produces slave signals corresponding to the path portion. The projector directs an electromagnetic radiation pattern to the path portion that generates first and second reflections when the electromagnetic radiation pattern intersects the mass. The master processing portion generates a master frame based on the master signals, the master frame having a master pattern representative of the first reflections. The at least one slave processing portion generates a slave frame based on the slave signals, the slave frame having a slave pattern representative of the second reflections. The slave processing portion is synchronized with the master processing portion to generate the slave frame at a time interval after the master processing portion generates the master frame. The master and slave patterns are operable to construct a model of the mass based on the time interval and positional relationships between the master and slave image sensors and the projector.

The features of this invention, and the manner of attaining them, will become more apparent and the invention itself will be better understood by reference to the following description of the disclosed embodiments taken in conjunction with the accompanying drawings.

Figure 1:
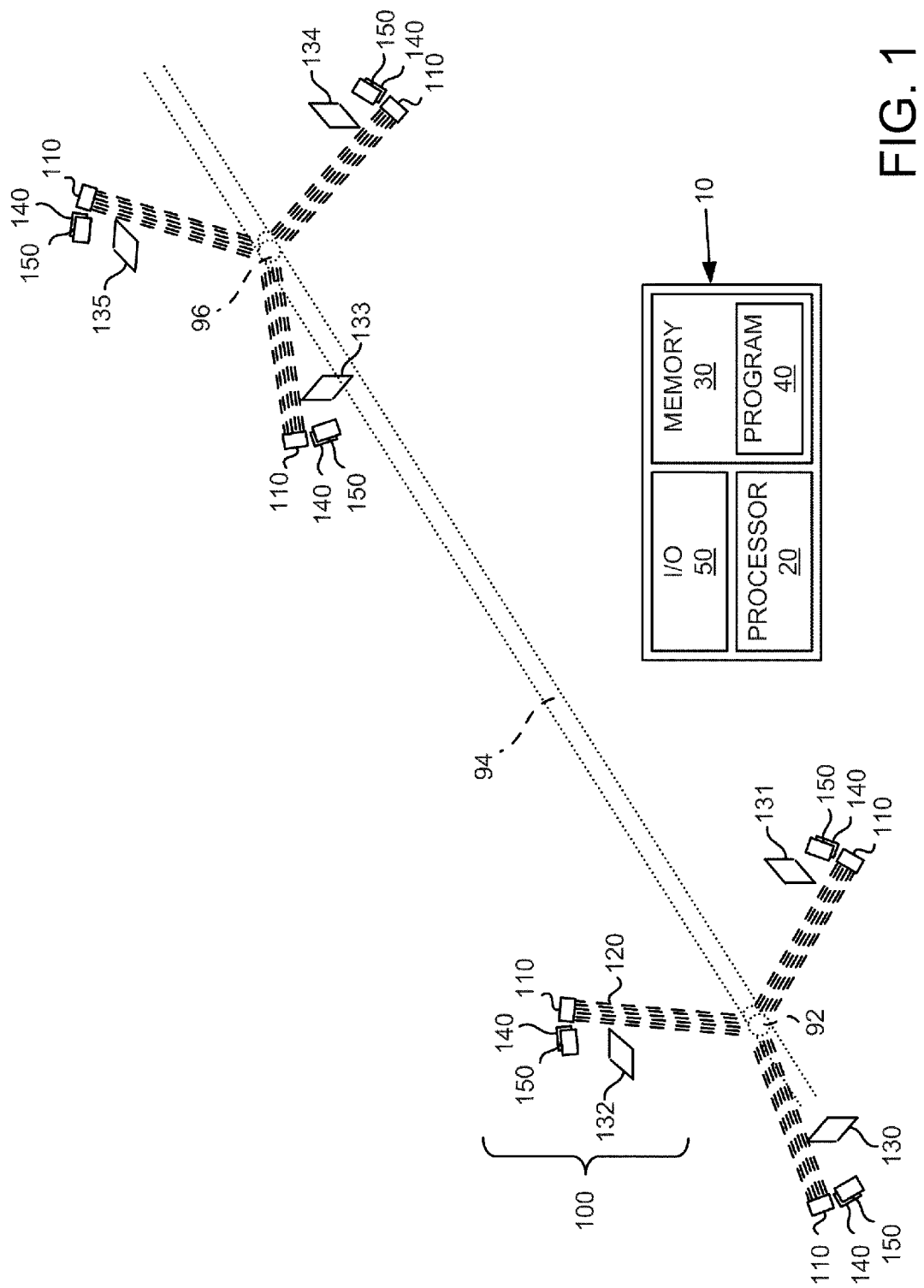
FIG. 1 is a conceptual perspective view of an embodiment of a modeling system according the invention.

Corresponding reference characters indicate corresponding parts throughout the several views. Although the drawings represent embodiments of the present disclosure, the drawings are not necessarily to scale and certain features may be exaggerated to better illustrate and explain the embodiments. The exemplifications set out herein illustrate embodiments of the invention in several forms and such exemplification is not to be construed as limiting the scope of the invention in any manner.

DETAILED DESCRIPTION

The embodiments discussed below are not intended to be exhaustive or limit the invention to the precise forms disclosed in the following detailed description. Rather, the embodiments are chosen and described so that others skilled in the art may utilize their teachings.

FIG. 1 is a conceptual perspective view of a modeling system according to one embodiment of the invention. The system comprises a plurality of imaging stations 100, each imaging station having projector 110 generating an electromagnetic pattern, e.g., a plurality of beams 120, and first camera 140 and second camera 150 capturing reflections of beams 120 on a moving mass in video frames generated by first camera 140 and second camera 150. Cameras 140, 150 are prior-art cameras comprising an image sensor and an image processing portion. Advantageously, second camera 150 is synchronized with first camera 140 by a time interval to capture frames after each frame captured by first camera 140 and before the subsequent frame captured by camera 140. The time interval can be created in any number of ways. For example camera 140 may be started first, and after the time interval, camera 150 may be started. Since the framing cycle of each camera is constant, the starting delay synchronizes all the frames. Alternatively, both cameras can be started and the timing of the frame generation monitored. The frame generation cycle of camera 150 can then be incrementally delayed to achieve the desired time interval. A timer may be applied to adjust the time interval. Synchronization may be achieved by delaying camera 150, delaying the production of a timing signal from camera 140 by the time interval, or in any other manner which creates a time interval between the timing cycle of the two cameras. The frame-rate of first and second cameras 140, 150 be equal or different. The synchronization effect results in imaging station 100 having a frame-rate which is higher, e.g. double, than the frame-rates of first and second cameras 140, 150. First camera 140 therefore acts as a master and second camera 150 acts as a slave (from a timing point of view). Additional third, fourth and more cameras may be used to triple, quadruple and further multiply the frame-rate of first camera 140. As used hereinbelow in accordance with the descriptions provided in this paragraph, "high frame-rate" means a frame-rate which is higher than the frame-rate of a master camera, produced by synchronizing one or more slave image sensors with a master sensor and "high frame-rate camera" means a camera including synchronized master/slave imaging sensors to capture images at a high frame-rate. As described below with reference to alternative embodiments of the invention, a high frame-rate camera may comprise synchronized image sensors in a common enclosure. Alternatively, a high frame-rate system may comprise multiple enclosures having image sensors, e.g. prior-art cameras, which are synchronized as described herein.

An image sensor is described, generally, as a grid of pixel photosensors dedicated to capturing light. Digital photo camera image sensors have resolutions greater than 10 megapixels. Video cameras have much smaller resolutions due to the time required by processing portions to "read" the sensors. As camera frame-rates increase, resolutions decrease. If resolutions decrease into single pixel ranges, it is not possible to obtain a useful model unless large numbers of image sensors are used. In exemplary embodiments, image sensors have resolutions of at least 25 pixels, more preferably 100 pixels, and even more preferably more than 400 pixels. A processing portion may comprise an electronic circuit, gates, shift-registers and processing sequences which, alone or in combination, convert the sensed light signals into digital data. Image sensors may comprise CCD, CMOS or other photosensors well known in the art. Generally, processing portions scan the grid to convert light to voltage and then to digital data which is stored in a memory buffer. As technology improves, pixel data transfer rates may continue to increase thereby enabling faster frame-rates at higher resolutions.

The memory buffer is, generally, co-located on a chip with the grid and processing portion. Image sensors may detect multiple colors. Bayer sensors use a color filter array that passes red, green, or blue light to selected pixels, forming interlaced grids sensitive to red, green, and blue. In prior-art cameras, the image is then interpolated using a demosaicing algorithm to produce a color image. Advantageously, in one embodiment of the invention, the color pixel data is not interpolated but, instead, three frames are obtained simultaneously from one image sensor to isolate light beams of different colors. In an alternative embodiment, a Foveon X3 sensor is used comprising an array of layered sensors where every pixel contains three stacked sensors sensitive to the individual colors. Similarly, the colors are separated and not interpolated. In a further embodiment of the invention, multiple single-color image sensors are used, each image sensor capturing a different color. As described below with reference to FIG. 5, cameras 140 and 150, and image sensors 142 and 152, may comprise any number of configurations and the invention is not limited to a specific embodiment having individual cameras and single image sensors in each camera. The sensor, processing portion and memory are sometimes referred to as an "imager" which captures light and converts the light into an array of digital signals which may be displayed as a digital frame representing the captured light. The array of digital signals may also be referred to as a frame for convenience.

Referring again to FIG. 1, beams 120 are directed at path 94 traveled by the mass at a high velocity, e.g. between 147 and 8,000 fps and even faster. Three imaging stations 100 are directed at first path portion 92 of path 94 and the additional imaging stations 100 are directed to second path portion 96 which is spaced apart from first path portion 92. First and second path portions 92 and 96 are shown in phantom. Each imaging station 100 captures video frames of a scene, each scene having a different viewpoint of the object, such as scene 130, 131, 132, 133, 134 and 135, which is determined by the position, e.g. location and orientation, of each imaging station 100. The imaging stations directed to the same path portion may be positioned substantially on the same plane, which plain intersects the path portion. The imaging stations may be oriented, preferably, 120 degree from each other. However, the imaging stations may be oriented in other directions so long as they can capture master and slave patterns from the same projected electromagnetic radiation pattern. Each frame may include a pattern based on the plurality of reflections, e.g. dots or lines, reflecting off the moving mass travelling in path 94. The video frames captured by each of the six imaging stations 100 are stored in memory 30 of computing system 10. Computing system 10 further includes processor 20, program 40 embedded in memory 30 and I/O 50. Program 40 comprises a plurality of processing sequences for analyzing the frames to construct the model of the moving mass.

Figure 2:
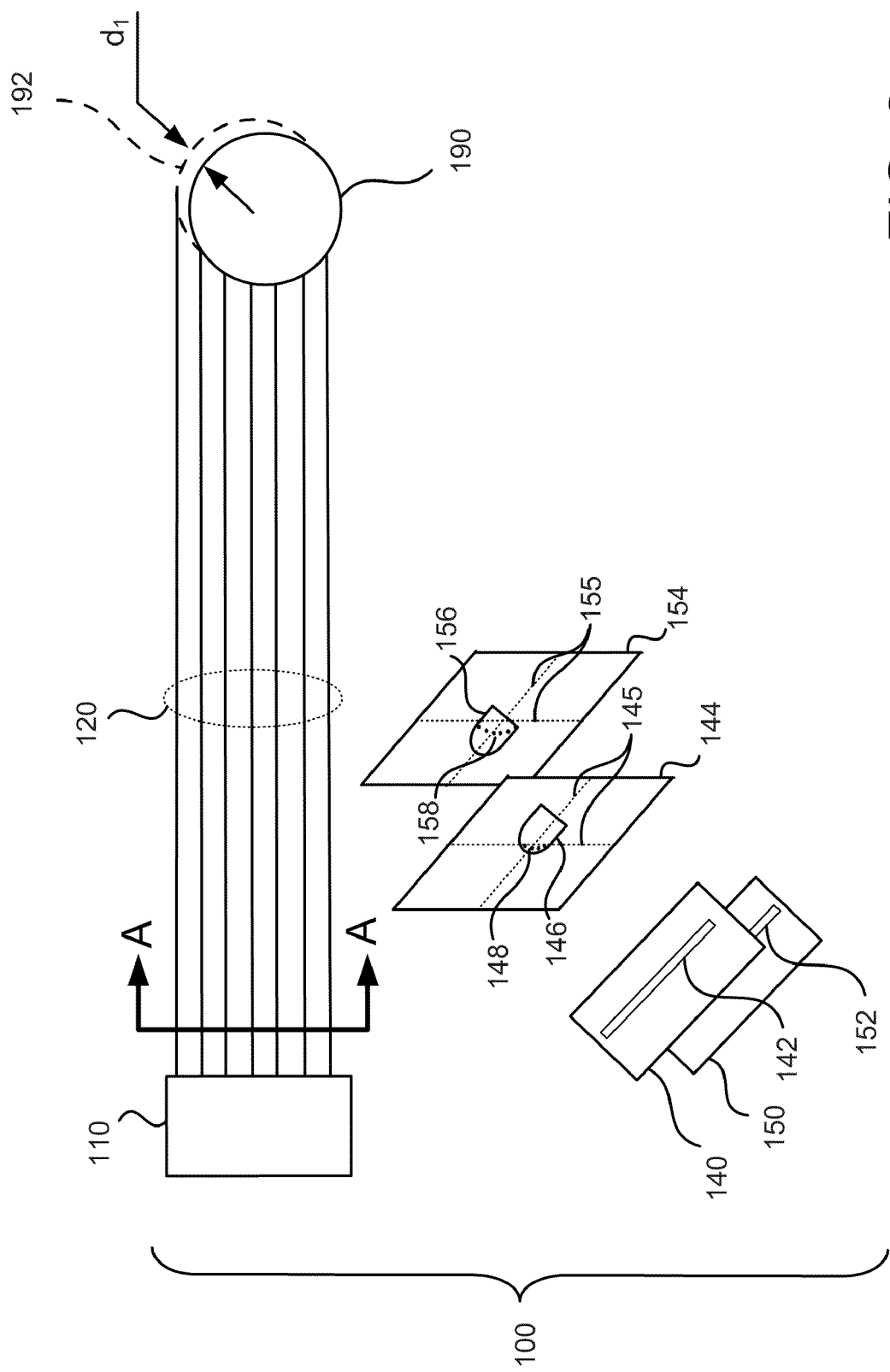
FIG. 2 is a conceptual perspective view of an imaging station shown in the modeling system of FIG. 1.

FIG. 2 is a conceptual perspective view illustrating the operation of imaging station 100. Projector 110 is directed at a mass shown in first position 190 and second position 192 (shown in phantom). A pattern of electromagnetic waves, e.g. light beams 120, intersect the mass initially at position 190 and later at position 192 producing two sets of reflections showing different portions of the mass. First frame 144 captures an image of the mass, illustratively object 146, and also the first set of reflections, illustratively master pattern 148. Second frame 154 captures the same scene but showing the mass at position 192 included in frame 154 as an object, illustratively object 156, including the second or subsequent set of reflections, illustratively slave pattern 158. The distance between first position 190 and second position 192 is defined as $d_1$ which represents the distance traveled by the mass between frames 144 and 154. Frame 154 is captured by image sensor 142 provided in camera 140 and frame 154 is captured by image sensor 152 provided in camera 150. Frames 144 and 154 capture images of substantially the same scene. The travel distance $d_1$ is illustrated in frames 144 and 154 by the lateral translation of object 156 relative to object 146 and frame centerlines 145, 155, and the substantially central position of patterns 148 and 158 representing the unchanging position of beams 120.

Figure 3B:
FIGS. 3A, 3B, 3C and 3D are conceptual plan views of alternative electromagnetic radiation patterns.
Figure 3D:
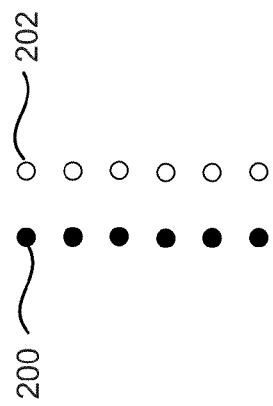
Figure 3A:
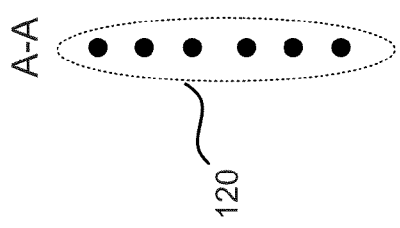
Figure 3C:
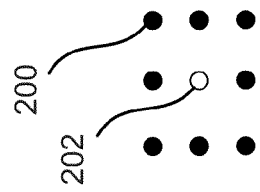

FIGS. 3A to 3D, a plurality of patterns of electromagnetic radiation are shown. A linear pattern is shown in FIG. 3A which may be generated by optically splitting a beam produced by a laser source or other source of focused visible or infrared light. More or less than six beams may be used. The number of beams is determined by design constraints such as distance, cost, environmental conditions, velocity of the mass, and the like. Beams may be close together to form a plane in which case the beams may be indistinguishable from each other. Advantageously, beams spaced apart equidistantly may simplify the calculation load on system 10 by enabling comparison of ratios of dots in patterns 148 and 158 vis a vis calculating geometric relationships between them. FIG. 3B illustrates an orthogonal pattern of beams 200 which has the same advantages provided by equidistantly disposed parallel beams. FIG. 3C illustrates an orthogonal pattern comprising beams 200 and beam 202, each having a different color. Advantageously, a central beam 202 forming an orthogonal pattern with beams of different color provides additional information which simplifies modeling. FIG. 3D illustrates an orthogonal pattern comprising parallel beams 200 and 202. Beam colors may be changed with filters.

Figure 4:
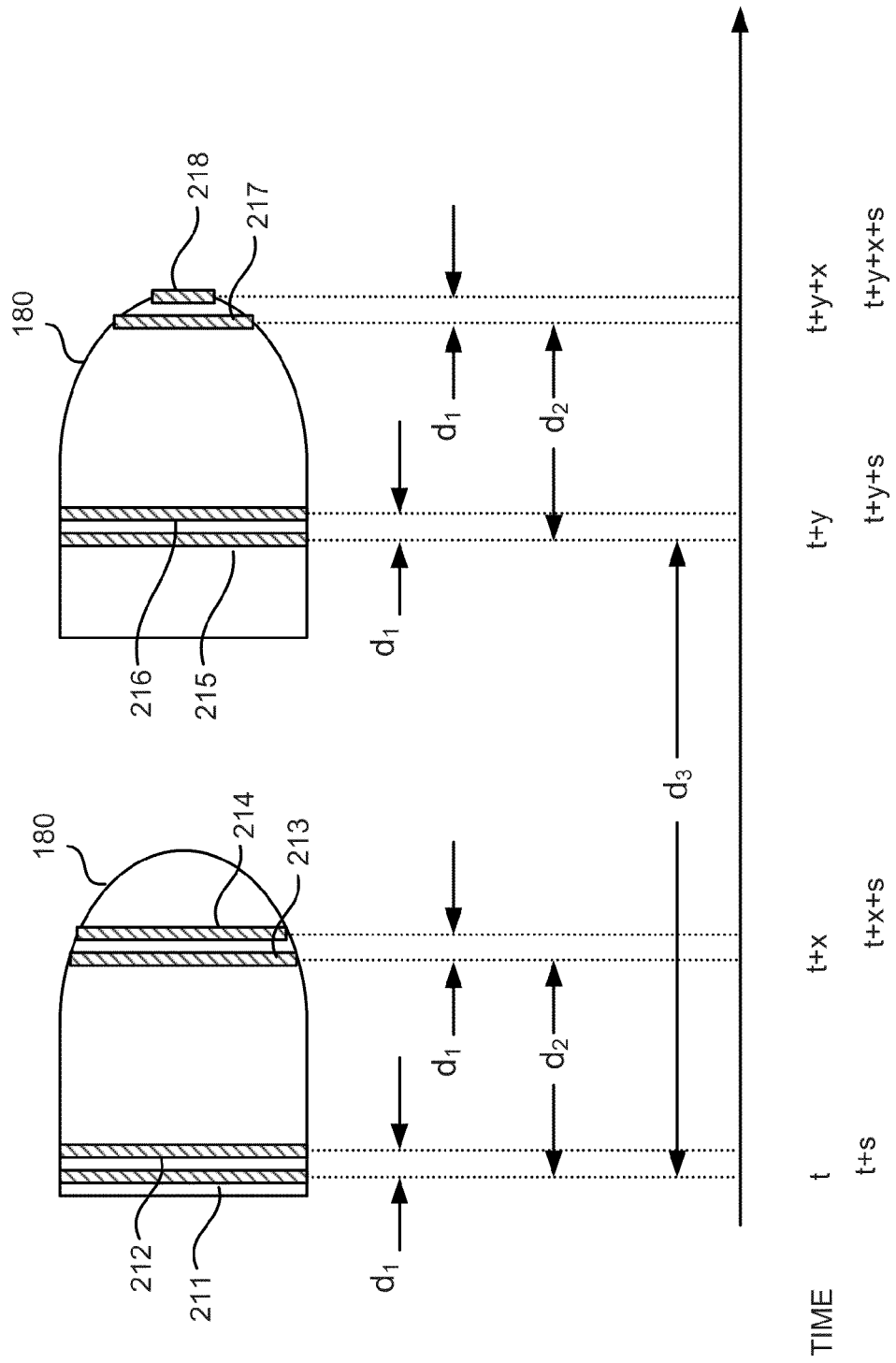
FIG. 4 is plan view of a timing diagram showing a mass in two positions.

Referring now to FIG. 4, a conceptual diagram is shown of mass 180 illustrating the timing sequence of frames captured with two spaced apart imaging stations 100. Eight lines, or frames, numbered 211 to 218 are shown. Frames 211-214 are captured by the first imaging station 100 and frames 215-218 are captured by the second imaging station 100. Frame 211 is captured at time t by the master and frame 212 is captured at time t+s by the slave camera. Distances $d_1$, $d_2$ and $d_3$ represent movement of mass 180 from time t to different time intervals related to the frame-rate and location of master and slave image sensors. Distance $d_1$ is derived from the value of and the velocity v of the mass. Subsequently, the master and slave cameras capture second frames numbered 213 and 214, respectively, at times t+x and t+x+s, where x corresponds to the frame-rate of the master camera. Distance $d_2$ is derived from the frame-rate of the master camera, distance between image sensors, and the velocity v of mass 180. Similarly, the second pair of master/slave cameras capture frames 215-218 at times t+y, t+y+s, t+y+x, and t+y+x+s, respectively. Distance $d_3$ is derived from the frame-rate of the master camera, the velocity v of mass 180 and the linear distance between master cameras along path 94. It is assumed for illustration purposes that both pairs of master/slave image sensors are spaced by distance ex. Different systems may be constructed where master/slave image sensor distances vary. Systems with additional pairs of image sensors may be constructed, in both linear and co-planar arrangements as shown in FIG. 1 or in any arrangement wherein reflections from a projector are visible in the master and slave frames. Given the synchronization time s and the distance between imaging stations 100, system 10 is able to correlate frames 211-218 to produce a three-dimensional model of mass 180 with algorithms for producing wire-frame models based on known system geometry and correlation of points based on the geometry of the system generating the points. An exemplary algorithm is disclosed in U.S. Pat. Appl. No. 2005/0128196 which is incorporated herein by reference in its entirety. Depending of the viewpoint of master/slave cameras, frames may be morphed before the correlation takes place. If the angle between the viewpoints is small relative to the distance between the image sensors and path 94, morphing may not be required.

Mass 180 is shown having a projectile shape comprising a single mass portion to illustrate a modeling system. However, the modeling system is not limited to single mass portions. In the case of exploding projectiles, for instance, mass 180 comprises a plurality of mass portions which may move at slightly different speeds and directions at different points in time. Each mass portion may collide with other mass portions and the collisions may change the configuration of the profile of mass 180. The profile may rotate as well as change shape. Advantageously, providing linearly spaced-apart sets of imaging stations enables system 10 to capture rotations and shape changes by acquiring data from multiple viewpoints at closely spaced time intervals. The synchronization delay between master/slaves image sensors may be adjusted to increase the resolution of the model. Obviously, additional image sensors may also be provided with the same effect. Mass 180 may also represent a fluid flow, e.g. liquid comprising distinguishing features. The distinguishing features, e.g. bubbles, lines, colors and the like, may similarly be correlated to model flow. Enhanced three-dimensional models may be obtained by providing additional imaging stations which provide additional datapoints for the model.

Figure 5B:
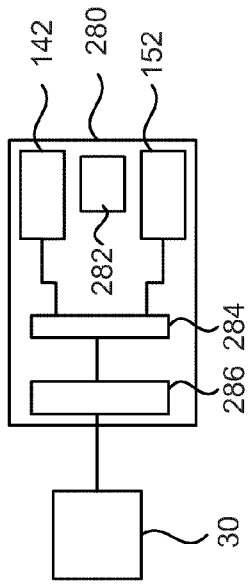
FIGS. 5A, 5B and 5C are block diagrams of alternative embodiments of image sensors and imaging stations according to the invention.
Figure 5C:
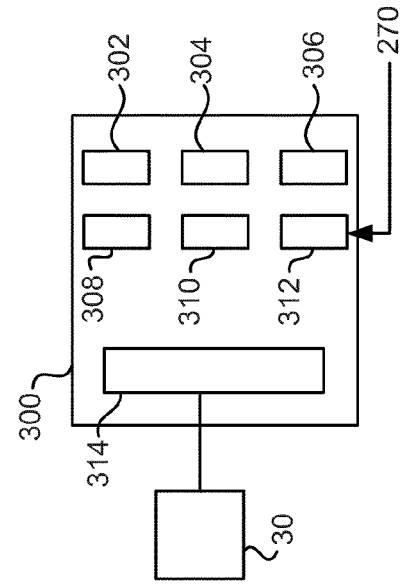
Figure 5A:
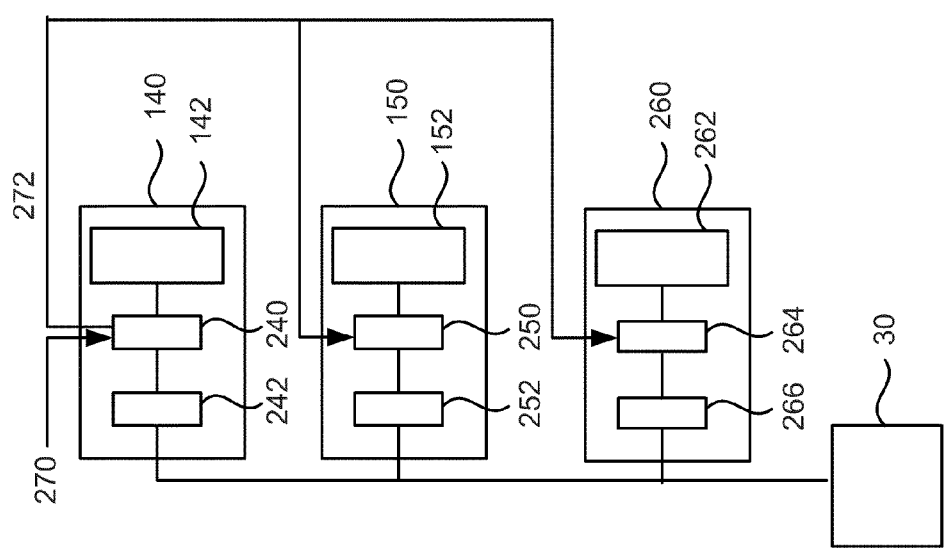

Referring now to FIGS. 5A, 5B and 5C, different arrangements of cameras and image sensors are shown. FIG. 5A illustrates cameras 140, 150 and 260 which produce video frames stored in memory 242, 252, and 266, respectively, before transferring the frames to system memory 30. Processing portions 240, 250, 264 convert photosensor signals from image sensors 142, 152, 262 into image data, or frames, comprising pixel data. Memory 242, 252 and 266 may comprise fast RAM, which is faster than memory 30, and may also be incorporated with processing portions 242, 252, 266, respectively to further increase access time by not requiring image data transfers through an data bus. Trigger signals 270, 272 may be provided from an external trigger event and from master camera 140 to synchronize cameras 150 and 260, such that video recording is synchronized with the movement of mass 180 and, with respect to cameras 150 and 260, video recording is delayed relative to recording by camera 140 by a fraction of the time required by camera 140 to capture a subsequent image. External trigger events may comprise a start signal initiating motion of mass 180 and/or a detector signal which senses movement of mass 180 a predetermined distance from camera 140. Signal 270 may also be provided by system 30. FIG. 5B illustrates an embodiment of an imaging station 280 comprising image sensors 142 and 152 equally spaced and having projector portion 282 disposed between them. Projector portion 282 may be a lens coupled to projector 110 to enable construction of an integrated imaging station. Memory 286 receives pixel data from processing portion 284 which converts pixel signals from image sensors 142 and 152 into pixel data. It should be understood that image sensors 142 and 152 may also comprise a single sensor grid, portions of which are polled at different times. For example, processing portion 284 may obtain signals from the grid in parallel, wherein signals are obtained from one portion of the grid and, after a time interval, signals are obtained from another portion of the grid while signals are still being obtained from the first portion of the grid. FIG. 5C illustrates an embodiment of high frame-rate camera 300 having image sensors 302, 304, 306 and memory 314 which thereby triples the frame-rate of a prior-art master camera. Processing portions 308, 310, 312 trigger at successive intervals, and may initiate triggering (frame generation) from signal 270, to generate pixel data from signals produced by imaging sensors 302, 304 and 306.

Figure 6:
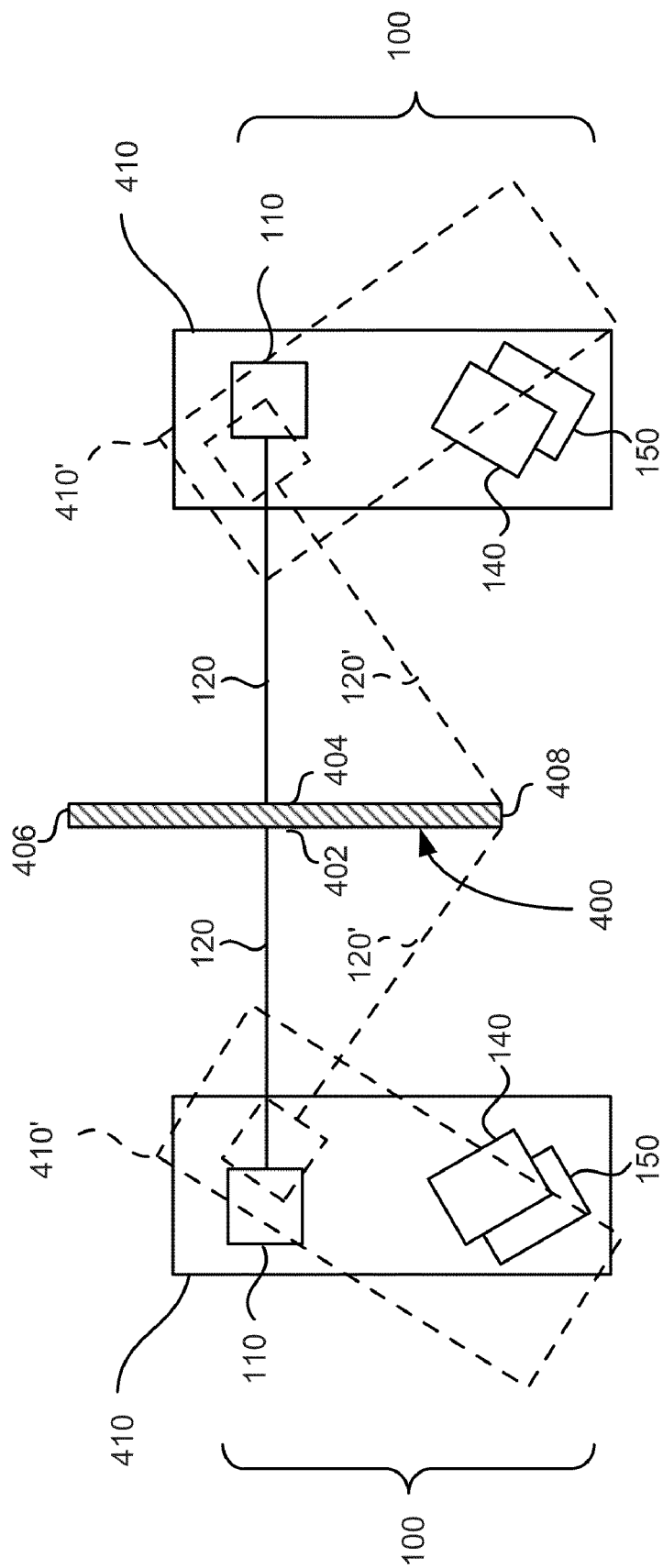
FIG. 6 is plan view of another embodiment of a modeling system according to the invention showing synchronously pivoting imaging stations scanning a web.

So far, various arrangements of stationary imaging stations were described. In a further embodiment of the invention, two imaging stations are pivotally and synchronously coupled, advantageously, to scan two sides of a moving web from edge to opposite edge. Such a system may be used for quality control purposes to identify objects, holes and imperfections on the web as it moves between the imaging stations. Referring to FIG. 6, imaging stations 100 are shown supported by frames 410. Frames 410 are shown in a second position as frames 410'. Beams 120 are directed to opposite surfaces 402, 404 of a portion of web 400 intermediate edges 406, 408. Beams 120' are directed to edge 408. As frames 410 pivot, beams 120' scan surfaces 402, 404 until they reach edge 406 at which time the process repeats in the opposite direction. Two-dimensional scanning may be implemented in a similar manner. Mechanisms for pivotally supporting a camera to scan across a web are well known.

Figure 7:
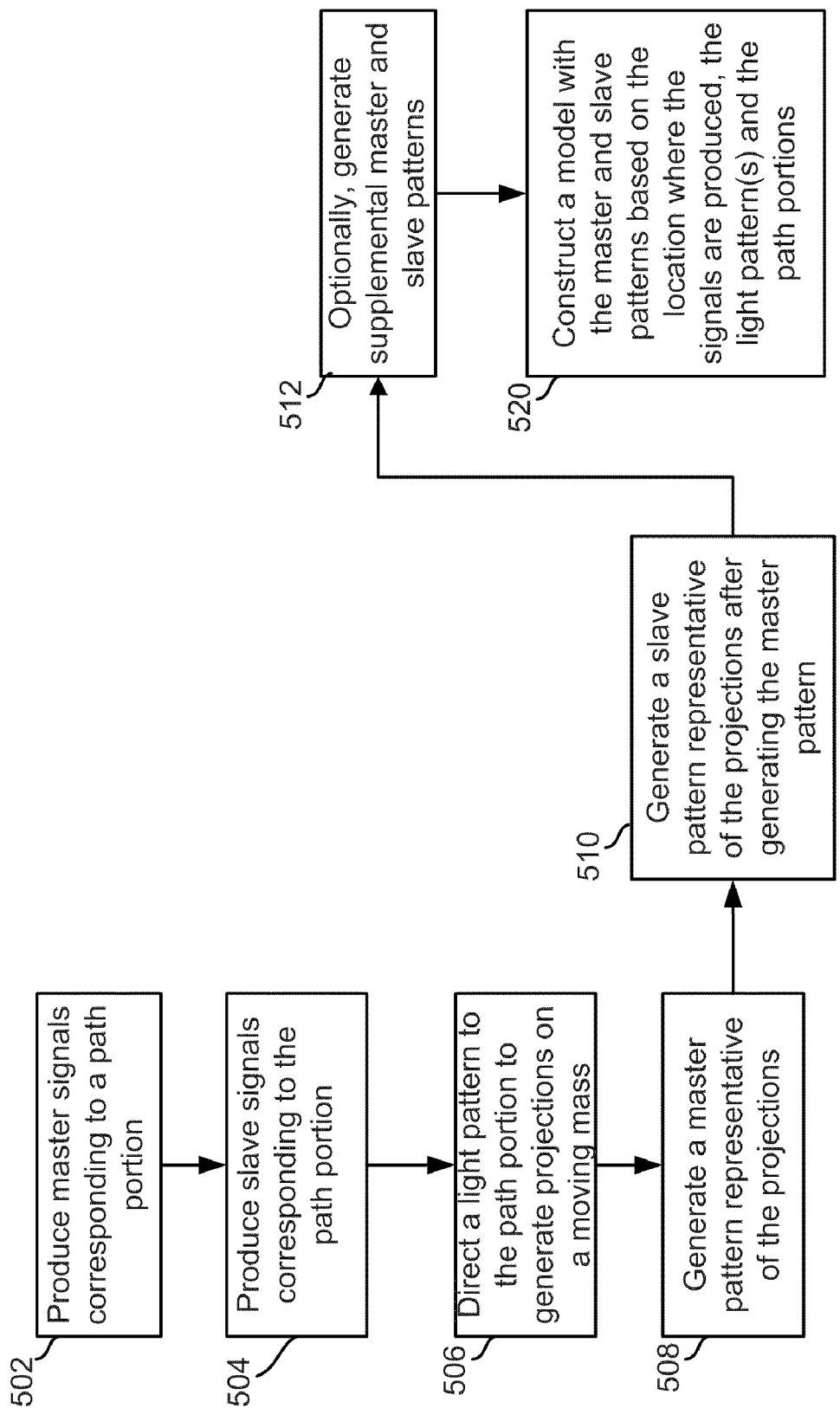
FIG. 7 is block diagram of an embodiment of a modeling method according to the invention.

Referring now to FIG. 7, a high-speed modeling method is disclosed comprising a number of steps. At step 502, master signals corresponding to a path portion of a path traveled by a mass are produced. At step 504, slave signals corresponding to the path portion are produced. At step 506, a light pattern is directed to the path portion to generate reflections when the light pattern intersects the mass. The light pattern comprises at least one of red, green and blue light. Additional light patterns may be provided by one or more projectors comprising at least a first light color. A light pattern produced by a supplemental projector may comprise at least a second light color. In one embodiment, the angle formed between the light pattern, the path portion and the position where the master signals are produced is less than about 20 degrees.

At step 508, a master pattern is generated which is representative of the reflections from the master signals. At step 510, at least one slave pattern is generated representative of the reflections from the slave signals a time interval after generating the master pattern and before generating a subsequent master pattern. The master and slave patterns are operable to construct a model of the mass based on the time interval and relationships between locations where the master and slave signals are produced, a direction of the light pattern, and the path portion. The patterns are included in frames generated by the processing portions at a processing portion frame-rate. Synchronization of master and slave processing portions multiplies the frame-rate of the master processing portion.

Optionally, at step 512, supplemental master and slave patterns may be produced with supplemental imaging stations, wherein the master and slave patterns and supplemental master and slave patterns generated by the supplemental imaging stations are operable to construct an enhanced model of the mass based on the model and positional relationships between the first and supplemental imaging stations. The supplemental patterns may be produced before, after or concurrently with the generation of the master and slave patterns produced by the first imaging station.

At step 520, the model is constructed. A synchronized frame-rate obtained by synchronizing production of a plurality of master and slave patterns exceeds, in one embodiment, 20,000 frames per second at a resolution greater than 400 pixels.

This invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A high-speed modeling system comprising:
a master image sensor producing master signals corresponding to a path portion of a path traveled by a mass;
at least one slave image sensor producing slave signals corresponding to the path portion;
a projector directing an electromagnetic radiation pattern to the path portion that generates first and second reflections when the electromagnetic radiation pattern intersects the mass;
a master processing portion generating a master frame based on the master signals, the master frame having a master pattern representative of the first reflections;
at least one slave processing portion generating a slave frame based on the slave signals, the slave frame having a slave pattern representative of the second reflections, and the slave processing portion being synchronized with the master processing portion to generate the slave frame at a time interval after the master processing portion generates the master frame; and
a second projector producing a second electromagnetic radiation pattern and third and fourth reflections when the second electromagnetic radiation pattern intersects the mass, wherein the at least one supplemental imaging station generates supplemental master and slave patterns based on the third and fourth reflections;
wherein the master and slave patterns are operable to construct a model of the mass based on the time interval and positional relationships between the master and slave image sensors and the projector;
wherein the master imaging sensor, the slave imaging sensor, the master processing portion and the slave processing portion comprise a first imaging station, further including at least one supplemental imaging station generating supplemental master and slave patterns, wherein the master and slave patterns and supplemental master and slave patterns, and positional relationships between the first and supplemental imaging stations, are operable to enhance the model with the addition of the supplemental master and slave patterns.

2. The high-speed modeling system of claim 1, wherein the time interval is shorter than the time elapsed between generation of the master frame and generation of a consecutive master frame by the master processing portion.

3. The high-speed modeling system of claim 1, wherein the system comprises a control portion configured to start generation of the slave frame by the slave processing portion after a time delay equal to the time interval, wherein the time delay begins when the master processing portion starts generating the master frame.

4. The high-speed modeling system of claim 1, wherein the master imaging sensor and the at least one slave imaging sensor are located in an enclosure, and a projecting portion of the projector is supported by the enclosure, wherein the projecting portion of the projector projects the electromagnetic radiation pattern.

5. The high-speed modeling system of claim 1, wherein the electromagnetic radiation pattern has a shape comprising at least one of a straight line, a square, a rectangle and a triangle, and wherein the shape comprises one of lines, dots, and a combination of lines and dots.

6. The high-speed modeling system of claim 1, wherein the master imaging sensor and the master processing portion are located in a first enclosure and the slave imaging sensor and the slave processing portion are located in a second enclosure.

7. The high-speed modeling system of claim 1, further including a computing system including software configured to construct the model.

8. The high-speed modeling system of claim 1, wherein an angle formed between the electromagnetic radiation pattern and a line connecting the first path portion and the master image sensor is less than about 20 degrees.

9. The high-speed modeling system of claim 1, wherein a synchronized frame-rate obtained by synchronizing the master and the at least one slave processing portions exceeds 10,000 frames per second at a resolution greater than 400 pixels.

10. The high-speed modeling system of claim 1, wherein the electromagnetic radiation pattern comprises one of infrared and visible light.

11. The high-speed modeling system of claim 1, wherein the electromagnetic radiation pattern comprises at least one of red, green and blue light.

12. The high-speed modeling system of claim 1, wherein the second electromagnetic radiation pattern is directed to a second path portion.

13. The high-speed modeling system of claim 12, wherein the at least one supplemental imaging station comprises five supplemental imaging stations, two of the five supplemental imaging stations generating supplemental slave patterns based on the electromagnetic radiation pattern, and three of the five supplemental imaging stations generating supplemental slave patterns based on the second electromagnetic radiation pattern.

14. The high-speed modeling system of claim 1, further including a first frame supporting the first imaging station and a second frame supporting the supplemental imaging station, the first imaging station positioned opposite the at least one supplemental imaging station, and the first and second frames pivotally mounted, wherein the path portion is located between the first and second frames and the first and a second imaging stations are operable to synchronously pivot and scan the first path portion.

15. The high-speed modeling system of claim 1, wherein the electromagnetic radiation pattern of the projector in the first imaging station comprises at least a first light color and the electromagnetic radiation pattern of the projector in the supplemental imaging station comprises at least a second light color.

16. A high-speed method of modeling comprising:
directing a electromagnetic radiation pattern to a path portion of a path traveled by a mass;
initiating capture of a master pattern with a master imager, the master pattern representing a first reflection pattern generated when the electromagnetic radiation pattern intersects the mass;
waiting a time interval after the initiating capture of a master pattern step;
initiating capture of at least one slave pattern with a slave imager, the slave pattern representing a second reflection pattern generated when the electromagnetic radiation pattern intersects the mass, the at least one slave pattern being synchronized with the master pattern by the time interval; and
generating a second electromagnetic radiation pattern to produce third and fourth reflections when the second electromagnetic radiation pattern intersects the mass, wherein the at least one supplemental imaging station generates supplemental master and slave patterns based, respectively, on the third and fourth reflections;
wherein the master and slave patterns are operable to construct a model of the mass based on the time interval, a direction of the electromagnetic radiation pattern, an angle formed by the electromagnetic radiation pattern and a line intersecting the path portion and a location of the master imager, and a second angle formed by the electromagnetic radiation pattern and a line intersecting the path portion and the location of the slave imager;
wherein the master and at least one slave patterns are generated by a first imaging station, further including the step of producing supplemental master and at least one slave patterns with at least one supplemental imaging station, wherein the master and slave patterns and the supplemental master and slave patterns are operable to enhance the model based positional relationships between the first and supplemental imaging stations.

17. The high-speed modeling method of claim 16, further including the step of constructing the model.

18. The high-speed modeling method of claim 16, wherein at least one of the angle and the second angle is less than about 20 degrees.

19. The high-speed modeling method of claim 16, wherein a synchronized frame-rate obtained by synchronizing generation of a plurality of master and slave patterns exceeds 10,000 frames per second at a resolution greater than 400 pixels.

20. The high-speed modeling method of claim 16, wherein the electromagnetic radiation pattern comprises at least one visible and infrared light.

21. The high-speed modeling method of claim 16, wherein the electromagnetic radiation pattern comprises at least one of red, green and blue light.

22. The high-speed modeling method of claim 16, wherein at least one slave pattern is based on the electromagnetic radiation pattern and on the second electromagnetic radiation pattern.

23. The high-speed modeling method of claim 16, wherein the second electromagnetic radiation pattern is directed to a second path portion of the path.

24. The high-speed modeling method of claim 23, wherein the at least one supplemental imaging station comprises five supplemental imaging stations, and wherein two of the five supplemental imaging stations generate supplemental slave patterns based on the electromagnetic radiation pattern, and three of the five supplemental imaging stations generate supplemental slave patterns based on the second electromagnetic radiation pattern.

25. The high-speed modeling method of claim 16, wherein the electromagnetic radiation pattern comprises at least a first light color and the second electromagnetic radiation pattern comprises at least a second light color.

26. A method of making a high-speed modeling system comprising:
providing a master image sensor producing master signals corresponding to a path portion of a path traveled by a mass;
providing at least one slave image sensor producing slave signals corresponding to the path portion;
providing a projector directing an electromagnetic radiation pattern to the path portion that generates first and second reflections when the electromagnetic radiation pattern intersects the mass;
providing a master processing portion generating a master frame based on the master signals, the master frame having a master pattern representative of the first reflections;
providing at least one slave processing portion generating a slave frame based on the slave signals, the slave frame having a slave pattern representative of the second reflections, and the slave processing portion being synchronized with the master processing portion to generate the slave frame at a time interval after the master processing portion generates the master frame; and
providing a second projector producing a second electromagnetic radiation pattern and third and fourth reflections when the second electromagnetic radiation pattern intersects the mass, wherein the at least one supplemental imaging station generates supplemental master and slave patterns based on the third and fourth reflections;
wherein the master and slave patterns are operable to construct a model of the mass based on the time interval and positional relationships between the master and slave image sensors and the projector;
wherein the master imaging sensor, the slave imaging sensor, the master processing portion and the slave processing portion comprise a first imaging station, further including at least one supplemental imaging station generating supplemental master and slave patterns, wherein the master and slave patterns and supplemental master and slave patterns, and positional relationships between the first and supplemental imaging stations, are operable to enhance the model with the addition of the supplemental master and slave patterns.

27. The method of making the high-speed modeling system of claim 26, wherein the time interval is shorter than the time elapsed between generation of the master frame and generation of a consecutive master frame by the master processing portion.

28. The method of making the high-speed modeling system of claim 26, wherein the system comprises a control portion configured to start generation of the slave frame by the slave processing portion after a time delay equal to the time interval, wherein the time delay begins when the master processing portion starts generating the master frame.

29. The method of making the high-speed modeling system of claim 26, wherein the master imaging sensor and the at least one slave imaging sensor are located in an enclosure, and a projecting portion of the projector is supported by the enclosure, wherein the projecting portion of the projector projects the electromagnetic radiation pattern.

30. The method of making the high-speed modeling system of claim 26, wherein the electromagnetic radiation pattern has a shape comprising at least one of a straight line, a square, a rectangle and a triangle, and wherein the shape comprises one of lines, dots, and a combination of lines and dots.

31. The method of making the high-speed modeling system of claim 26, wherein the master imaging sensor and the master processing portion are located in a first enclosure and the slave imaging sensor and the slave processing portion are located in a second enclosure.

32. The method of making the high-speed modeling system of claim 26, further including providing a computing system including software configured to construct the model.

33. The method of making the high-speed modeling system of claim 26, wherein an angle formed between the electromagnetic radiation pattern and a line connecting the first path portion and the master image sensor is less than about 20 degrees.

34. The method of making the high-speed modeling system of claim 26, wherein a synchronized frame-rate obtained by synchronizing the master and the at least one slave processing portions exceeds 10,000 frames per second at a resolution greater than 400 pixels.

35. The method of making the high-speed modeling system of claim 26, wherein the electromagnetic radiation pattern comprises one of infrared and visible light.

36. The method of making the high-speed modeling system of claim 26, wherein the electromagnetic radiation pattern comprises at least one of red, green and blue light.

37. The method of making the high-speed modeling system of claim 26, wherein the second electromagnetic radiation pattern is directed to a second path portion.

38. The method of making the high-speed modeling system of claim 37, wherein the at least one supplemental imaging station comprises five supplemental imaging stations, two of the five supplemental imaging stations generating supplemental slave patterns based on the electromagnetic radiation pattern, and three of the five supplemental imaging stations generating supplemental slave patterns based on the second electromagnetic radiation pattern.

39. The method of making the high-speed modeling system of claim 26, further including providing a first frame supporting the first imaging station and a second frame supporting the supplemental imaging station, the first imaging station positioned opposite the at least one supplemental imaging station, and the first and second frames pivotally mounted, wherein the path portion is located between the first and second frames and the first and a second imaging stations are operable to synchronously pivot and scan the first path portion.

40. The method of making the high-speed modeling system of claim 26, wherein the electromagnetic radiation pattern of the projector in the first imaging station comprises at least a first light color and the electromagnetic radiation pattern of the projector in the supplemental imaging station comprises at least a second light color.

\* \* \* \* \*